Patent 2,712,540 — July 5, 1955

2,712,540
METHOD OF MANUFACTURING SOYBEAN PROTEIN

Charles T. Nugent and Nathan R. Gotthoffer, Cincinnati, Ohio, assignors to The Buckeye Cotton Oil Company, Memphis, Tenn., a corporation of Ohio No Drawing. Application September 16, 1953,
Serial No. 380,588

12 Claims. (Cl. 260—123.5)

This invention relates to a method of producing a substantially unhydrolyzed soybean protein and has as its principal object the preparation of unhydrolyzed protein in dry form characterized by substantially complete solubility upon dispersion in weakly alkaline solutions.

Extraction of protein from protein-containing seed material by means of aqueous alkaline solution to produce a substantially unhydrolyzed protein is well known. In all of the known processes, however (e. g. U. S. Letters Patent 2,451,659 to Francis E. Calvert, granted October 19, 1948), the final product is not ordinarily suitable for use in all of the various fields in which protein is employed.

In the field of paper coating for example, when prepared by the methods disclosed in the prior art, unhydrolyzed soybean protein is found to dissolve incompletely in the usual mildly alkaline dispersing mediums and a relatively large amount of insoluble residue is evident. This insoluble residue renders the protein particularly unsatisfactory for paper coating compositions since it gives rise to imperfections which show up as dark spots on the coated paper. In addition, the insoluble portions tend to agglomerate and form masses which accumulate on the screens, doctor blades and other parts of the coating equipment.

If an attempt is made to dissolve such protein more completely, for example by using stronger alkali, solutions are obtained which tend to be highly viscous and set to stiff gels even at relatively low concentrations of protein. In paper coating mills these properties of high viscosity and gel formation in the protein solutions are extremely undesirable since, when such solutions are used in preparing coating compositions, the composition cannot be smoothed out easily and satisfactorily and tends to give the coated product a rough appearance. Moreover, additional difficulties are encountered in stirring and transferring such solutions owing to their high viscosity and, when allowed to stand for a time, such solutions set to stiff gels and must either be discarded or can be used only after considerable expense in bringing them back to working consistency.

It has also been found that if, in drying the freshly prepared protein, it is subjected to relatively high temperatures, e. g. 170° F., gel formation of cold alkaline solutions of such protein is very pronounced and there is substantial increase in the amount of insoluble residue when the protein product is redispersed in the mildly alkaline solutions used in the paper coating industry.

We have found that these disadvantages can be substantially eliminated by introducing during the protein isolation process, an organic material selected from the group consisting of chlorinated unsaturated fatty acids having from about 10 to 18 carbon atoms, a chlorinated mixture of fatty acids, which mixture of fatty acids, prior to chlorination, contains at least 5% of an unsaturated fatty acid having from about 10 to 18 carbon atoms, and which is a mixture of fatty acids derived from or corresponding to those occurring in vegetable and animal fats and oils, water-soluble soaps of the said chlorinated unsaturated fatty acids, water-soluble soaps of the said chlorinated mixture of fatty acids, and mixtures of any of these. Such organic materials will hereinafter be termed insolubles inhibitors or insolubles inhibiting agents.

Francis E. Calvert in U. S. Letters Patent 2,451,659 (referred to above) and U. S. Letters Patent 2,534,227 and 2,534,228, both granted December 19, 1950, has advocated the addition of various organic liquids during the protein isolation at any time prior to drying of the protein curd to produce a white or nearly colorless protein. His agents are, however, ineffective for reducing the amount of insoluble residue to the desired level for paper-coating applications when the protein is redispersed in mildly alkaline solutions.

We have discovered that an unhydrolyzed protein having a color comparable to that obtained with the process of the Calvert patents referred to above and, in addition, having substantially complete solubility upon dispersion in weakly alkaline solutions can be produced by the addition during the isolation process of an insolubles inhibiting agent as hereinbefore defined.

Our invention will be described by reference to chlorinated fatty acids, but it will be appreciated by those skilled in the art that comparable results may be achieved with halogenated agents in general, for example, brominated or fluorinated fatty acids. The chlorinated compounds are, of course, preferred because of convenience and economy.

In the practice of our process in general, substantially oil-free soybean flakes are slurried with an aqueous alkaline solution. The resultant alkaline slurry (pH 7 or higher) is heated to a temperature in the range from about 90° to 120° F. and the extraction of the protein is carried out at a pH up to 10.5, usually for less than an hour. (In order to obtain a satisfactory protein yield an extraction time of at least about 20 minutes is believed desirable. Also, times of extraction in excess of one hour may be used but have no beneficial advantage, and may, in fact, be disadvantageous in that such longer times may allow for undesirable bacterial growth in the protein dispersion and may also be reflected in the development of various undesirable characteristics in the finished protein product.) The first extract is usually screened and, if desired, may be centrifuged after the screening operation for further clarification. To insure a better yield, the wet flakes from the first screening operation may then be reslurried with an amount of water somewhat in excess of the weight of the wet flakes. The extract from this second operation is usually again screened to separate soybean flakes residue and may, if desired, also be further clarified by centrifuging. The two extracts are then combined and the protein is precipitated from the combined solution. This is usually accomplished by the addition of an acid to bring the solution to the isoelectric range of the protein, although other methods, such as dialysis or salting out, may be used. (It is generally accepted that the isoelectric point of protein may vary with the method used for extraction of the protein and that therefore the isoelectric point may vary from about 4.1 to about 4.8 pH, hence the reference to "isoelectric range.") The precipitated protein curd is then concentrated either by settling or centrifuging and the concentrated curd is then water-washed and filtered at a pH of about 4.6. The filtered curd is then dried and ground to prepare it for further use.

The temperature at which the extracted protein is dried may be varied over a relatively wide range although high temperatures are to be avoided because they tend to increase the amount of material remaining undissolved upon resolution of the protein in accordance with procedure set forth below. With any given one of the organic materials herein proposed as insolubles inhibitors it is to be appreciated that differing degrees of protection will be obtained at various drying temperatures. Preferably the drying temperature should not exceed 170° F. but it is to be understood that the maximum drying temperature is to be controlled so that the amount of material which does not dissolve on dispersion of the protein is not greatly increased.

The chlorinated fatty acids or chlorinated fatty acid mixtures we have proposed as insolubles inhibiting agents may be added at any point in the above described process where the pH of the slurry or solution is sufficient to substantially saponify the particular chlorinated fatty acid or chlorinated fatty acid mixture that may be added but not above 10.5, provided the temperature is not then greater than 120° F., but sufficiently high to give an economically reasonable time for the saponification of any chlorinated fatty acid or mixture added.

For the realization of optimum results from the process as a whole we prefer to add our agents at any point in the process where the pH of the solution or slurry is from about 8.5 to 10.5 and where the temperature is in the range from about 70° to 120° F. Maximum benefits are believed to be obtained when the aforementioned agents are added to the extract after separation of the soybean flakes within the pH range specified and where the temperature is in the range from about 90 to 120° F.

It is to be understood that a good physical dispersion of the agent in the protein-containing solution or slurry is also necessary to obtain optimum results.

The dried protein produced by the above process exhibits substantially complete solubility upon redispersion in an aqueous alkaline medium containing about 2% sodium hydroxide, added as a 15% sodium hydroxide solution and about 10% of concentrated ammonium hydroxide (28% NH₃), the percentage of the alkaline reagents added being based on the weight of the protein to be redispersed. Such an alkaline solution would have a pH in the range from about 9.0 to 9.5 and would come within the scope of the term "mildly alkaline" as used herein. It is to be appreciated that the dried protein may be also redispersed in various salt solutions and that with salts such as, for example, sodium sulfite and sodium carbonate, a pH of 7 or slightly above, is adequate for redispersion and that such dispersing solutions are also identified by the term "mildly alkaline."

Although we do not wish to be bound by any theory, we believe that the suppression of the formation of insoluble material in the protein isolation process is the result of a physical effect as distinguished from an effect which is the result of a chemical reaction between the insolubles inhibiting agent and the protein.

This theory of physical protection is predicated upon, and is supported by, the fact that a free fat analysis of the finished protein indicated that the fat content was proportional to the amount of chlorinated fatty acid added. If the chlorinated fatty acid were held by a chemical bond it is doubtful that it would be extracted, and if it were possible to extract it, it is highly unlikely that it would be extracted in proportion to the amount added.

In general, any of the aforesaid insolubles inhibiting agents or products resulting when such agents are added during the isolation process under the conditions hereinbefore specified, in the amounts in which it is contemplated that such agents will be added, are characterized by substantial solubility at the pH and temperatures prescribed for the points in the isolation process at which the additions are to be made. More specifically, the agents contemplated, or products resulting when the agents are added during the isolation process, are substantially soluble at about 90 to 120° F. in aqueous solutions of about 8.5 to about 10.5 pH, are substantially insoluble at about 90 to 120° F. in aqueous solutions of about 3.5 to 5.5 pH, and are chemically stable and non-volatile at temperatures up to about 170° F.

It is to be understood that the temperature and pH may be varied depending upon the particular insolubles inhibiting agent which is to be used.

Examples of some of the various agents which are effective for the purpose herein specified are:

(a) Chlorinated oleic acid;
(b) The chlorinated mixture of fatty acids derived from coconut oil;
(c) The chlorinated mixture of fatty acids derived from cottonseed oil;
(d) The chlorinated mixture of fatty acids derived from soybean oil;
(e) The chlorinated mixture of fatty acids derived from animal tallow;
(f) The chlorinated mixture of fatty acids derived from marine oils; and
(g) Mixtures of any of the above.

The chlorinated fatty acids, which preferably contain from about one to about four chlorine atoms per molecule of fatty acid, may be conveniently prepared, for example, by bubbling chlorine gas through the liquid fatty acid, cooled with water to room temperature, until the desired degree of chlorination has been obtained. The chlorine and hydrogen chloride present as impurities in the chlorinated fatty acids after such treatment are easily removed by evacuation, first at about 140° F. and finally at room temperature for from about four to eight hours. In some instances it may be advantageous to first dissolve the fatty acids in chloroform before chlorinating as above, the chloroform acting as a diluent and a special solvent for the chlorine. (When this procedure is used it is advisable to cool the chlorinating vessel with ice to minimize the carry-over of chloroform.)

These agents are normally added during the isolation process in amounts from about 0.25% to 5.0% by weight of the oil-free soybean material being extracted. Amounts in excess of 5.0% could be used with satisfactory results as regards insolubles inhibition but, as a practical matter, such amounts are not economically justifiable and may, in some cases, give rise to undesirable effects. For example, if too large amounts are added a dilution effect may take place. This may be explained as a reduction, through dispersion in a greater amount of liquid, of the effective protein in the dispersion. The result is a loss in adhesive strength in coating compositions prepared from such protein dispersion.

Amounts less than 0.25% may also be used to some advantage but the desired degree of suppression of insolubles formation is seldom realized if such lesser amounts of the agents are used. We normally prefer to add the agents in an amount from about 0.5% to 2.0% by weight of the oil-free soybean material being extracted.

In addition to the reduction in the amount of insoluble residue when protein prepared in accordance with our invention is dispersed in mildly alkaline solutions, other advantages have been unexpectedly realized from the utilization of the aforementioned agents in the protein isolation process.

In the isolation process, an anti-foaming agent is normally used to prevent the formation of, or at least substantially reduce the amount of, foam which forms during the normal handling of the protein dispersion; and although many commercially available anti-foaming agents adaptable to the particular system being used may be employed, a composition which we have found to be particularly effective comprises a combination of mineral seal oil, Neofat–11 (a commercial fatty acid preparation comprising predominantly lauric acid), polypropylene glycol of high molecular weight and an emulsifying agent. A composition of this type is sold under the trade name Nalco 71–D5 by the National Aluminate Company of Chicago, Ill.

We have found that the insolubles inhibiting agents of our invention have, in themselves, an anti-foaming action and that when added allow a substantial reduction in the amount of actual anti-foaming agent which must be used. In addition, the solids discharge more easily from the centrifuge nozzles because of the lubricating effect of the added insolubles inhibiting agents. Also, the protein product in dispersion, as contrasted with dispersions of protein which have been prepared by conventional methods, gives a clearer solution, has a better resistance to spoilage, and is found to have improved aging properties in that the viscosity of the dispersion remains lower and the amount of insoluble material remains lower upon aging of the dispersion.

In all of the following examples, which are to be understood to be illustrative only and to limit the invention in no way, the amount of insoluble material was determined by the following method.

134 ml. of water at room temperature were placed in a 400 ml. container immersed in a water bath and agitated at about 250 to 300 R. P. M. 0.34 gram of sodium sulfite was added to the water in the container to aid in reducing the viscosity of the ultimate protein dispersion (other materials, such as stannous chloride, may also be used for this purpose). To this solution 30 grams of protein, ground to pass a 40 mesh U. S. standard screen, were added. After the protein had been thoroughly mixed with the solution, 3 ml. of concentrated ammonium hydroxide (28% NH3) and 2% sodium hydroxide by weight of protein being dispersed, added as a 15% sodium hydroxide solution, were added to the solution, the mixture was then heated with agitation, up to 130° F. within 15 minutes elapsed time and agitation was continued for a total of 30 minutes at a temperature of 130±2° F.

The resultant dispersion was then added to four times its volume of water at room temperature, mixed thoroughly, and screened through a 100 mesh U. S. standard screen. The residue retained by the screen was rinsed by dipping the screen in water at room temperature after which the screen was allowed to drain and the rinse repeated. The washed residue on the screen was then washed into a tared beaker and dried to constant weight at about 200° F. The insoluble material is expressed as a percentage of the original protein going into the dispersion (30 grams).

A 100 mesh U. S. standard screen was chosen as the criterion for determining the effective amount of insoluble residue since any particles of insoluble material larger than 100 mesh size will tend to cause difficulties in paper coating applications.

*Example 1.*—Typical blank run.—3.0 grams of sodium sulfite was added to 4200 ml. of water at 105° F. with agitation, and to the resultant solution 300 grams of substantially oil-free soybean flakes was added. After the flakes were thoroughly wet, 70 ml. of 2½% sodium hydroxide solution were added to the slurry to bring it to a pH of approximately 9.2. The slurry was maintained at a temperature of 105±2° F. and additional amounts of 2½% sodium hydroxide were added, 30 ml. after 10 minutes, and another 15 ml. after 20 minutes. A final adjustment of the solution to a 9.2 pH was made after 28 minutes. Agitation was continued for a total of 30 minutes. The extraction slurry was then screened through a 100 mesh U. S. standard screen.

A second extraction of the screened flakes was made by adding 1400 ml. of water to the flakes, agitating for 5 minutes at 105° F. and again screening the flakes from the extract.

The extracts from the two operations were then combined a small amount of Nalco 71–D5 was added as an anti-foaming agent, and the solids were centrifuged from the liquor. The protein was precipitated from the centrifuged extract by the addition of 7½% sulfuric acid solution to a pH of about 4.6. The precipitated protein curd was allowed to settle and two liters of supernatant liquor was decanted. An amount of water, at room temperature, equal to the amount decanted, was added to the curd, mixed well, and the curd was again allowed to settle. This washing procedure was repeated and after the curd had settled, three liters of supernatant liquor from the second settling was decanted, 0.5 ml. of Nalco anti-foam agent was well mixed with the remaining slurry, and this slurry was then filtered through a Büchner funnel.

The filtered curd was shredded through a 6 mesh U. S. standard screen and dried in a circulating air oven at 145° F. for two hours.

The isolation procedure set forth above was used in all of the following examples as the standard procedure, the only variation being in the addition of the various organic materials for suppression of the formation of insolubles. When a "blank" is indicated, the insolubles matter remaining upon resolution of the protein produced in accordance with the method set forth hereinbefore, is the value used for comparison purposes.

It is to be appreciated that the variation in the blank run insolubles values in the examples is not a function of the particular insolubles inhibiting agent added but is due to the variation in quality (e. g. amount of dirt, trash and hulls present in the flakes, prior heat treatment of the flakes) of the particular soybean flakes used in each run.

*Example 2.*—Several extractions were made from a batch of soybean flakes following the procedure of Example 1 except that in each of the runs a different percentage of chlorinated oleic acid was added to the extract liquor just prior to precipitation of the protein therefrom.

This addition was carried out as follows:

The centrifuged liquor was heated to 105° F. while being agitated, the chlorinated oleic acid was added in the percentage desired, and the mixture was then allowed to mix for at least five minutes before the protein was precipitated.

Results appear in the table below.

*Table I*

| Percent of Chlorinated Oleic Acid | On 100 mesh Insolubles |
|---|---|
| 0 | .046 |
| 0.25 | .018 |
| 0.50 | .017 |
| 1.00 | .005 |

*Example 3.*—The procedure of Example 2 was followed except that the insolubles inhibiting agent was varied and added in varying amounts as indicated in the table below.

*Table II*

| Insolubles Inhibitor | On 100 mesh Insolubles | | |
|---|---|---|---|
| | 1% Inhibitor | 3% Inhibitor | 5% Inhibitor |
| None (Blank) | .140 | .140 | .140 |
| Chlorinated CNOFA* | .005 | .007 | .004 |
| Chlorinated SBFA** | .003 | .007 | .012 |
| Chlorinated CSFA*** | .013 | .005 | .008 |

*CNOFA denotes the mixture of fatty acids derived from coconut oil.
**SBFA denotes the mixture of fatty acids derived from soybean oil.
***CSFA denotes the mixture of fatty acids derived from cottonseed oil.

It may readily be seen from the foregoing examples that a very marked decrease in the amount of insoluble residue can be obtained with the process of our invention, and it is to be understood that insolubles inhibiting agents, other than those specifically set forth in the foregoing examples, but coming within the scope of the appended claims may be substituted in those examples with comparable results.

Similar results are achieved by the use of sodium hydroxide, sodium sulfite, potassium hydroxide, and other conventional extracting agents, in lieu of the sodium hydroxide and sodium sulfite combination of the above examples.

In general, the details of the alkaline extraction procedure form per se no part of the invention and may be varied widely, within such limits as are specified hereinafter, for the purposes of the invention as outlined herein. The essence of the invention resides in the selection and use in effective amount, in conventional alkaline extraction of soybean protein, of insolubles inhibiting agents of the classes designated herein. The use of various other extraction, addition, and improving agents which do not interfere with or destroy the effectiveness of the insoluble inhibitors of the present invention is, of course, contemplated.

Having thus described the invention, what we claim is:

1. In a method for isolating, from soybean material, a substantially unhydrolyzed protein characterized primarily by a low insoluble residue upon dispersion in mild aqueous alkali, the steps which comprise treating substantially oil-free protein-containing soybean material with an alkaline solution at a pH up to 10.5 and at a temperature in the range from about 70° to 120° F. to extract the protein in a substantially unhydrolyzed condition, separating the solution from the residue, reducing the pH of the solution to the isoelectric range of the protein to precipitate the protein therefrom, and adding to the proteinaceous material, in an amount from 0.25% to 5.0% by weight of the protein, an insolubles inhibiting agent selected from the group consisting of chlorinated unsaturated fatty acids having from about 10 to 18 carbon atoms, a chlorinated mixture of fatty acids, which mixture of fatty acids, prior to chlorination, contains at least 5% of an unsaturated fatty acid having from about 10 to 18 carbon atoms, and which is a mixture of fatty acids corresponding to those occurring in vegetable and animal fats and oils, water-soluble soaps of the said chlorinated unsaturated fatty acids, water-soluble soaps of the said chlorinated mixture of fatty acids, and mixtures thereof, the said insolubles inhibiting agent being added at any stage in the isolation process where the alkaline protein-containing solution has a pH not greater than 10.5 and when the temperature is not greater than 120° F.

2. In a method of isolating, from soybean material, a substantially unhydrolyzed protein characterized primarily by a low insoluble residue upon dispersion in mild aqueous alkali, the steps which comprise treating the substantially oil-free protein-containing soybean material with an alkaline solution at a pH up to 10.5 and at a temperature in the range from 90° to 120° F. to extract the protein in a substantially unhydrolyzed condition, separating the solution from the residue, reducing the pH of the solution, by the addition of acid, to the isoelectric range of the protein to precipitate the protein therefrom, and adding to the proteinaceous material, at any stage in the process where the temperature is in the range from 90° to 120° F. and the pH of the protein-containing solution is from 8.5 to 10.5, in an amount from 0.25 to 5.0% by weight of the protein, an insolubles inhibiting agent selected from the group consisting of chlorinated unsaturated fatty acids having from about 10 to 18 carbon atoms, a chlorinated mixture of fatty acids, which mixture of fatty acids, prior to chlorination, contains at least 5% of an unsaturated fatty acid having from about 10–18 carbon atoms, and which is a mixture of fatty acids corresponding to those occurring in vegetable and animal fats and oils, water-soluble soaps of the said chlorinated unsaturated fatty acids, water-soluble soaps of the said chlorinated mixture of fatty acids, and mixtures thereof.

3. The method of claim 2 wherein the alkaline protein-extracting medium is a sodium hydroxide solution.

4. The method of claim 2 wherein the alkaline protein-extracting medium is a sodium hydroxide solution containing a small amount of sodium sulfite.

5. The method of claim 2 wherein the protein-extracting agent is sodium sulfite.

6. In a method for isolating, from soybean material, a substantially unhydrolyzed protein characterized by relatively low viscosity and a low insoluble residue when dispersed in mild alkaline solutions, the steps which comprise treating the substantially oil-free protein-containing soybean material at a pH up to 10.5 with a solution of sodium hydroxide containing from about 0.5 to 2.0% sodium sulfite by weight of the soybean material being treated, at a temperature in the range from 103° to 107° F., to extract the protein, separating the solids from the resultant slurry, adding to the separated solution in an amount from 0.5 to 2.0% by weight of the protein, an insolubles inhibiting agent selected from the group consisting of chlorinated unsaturated fatty acids having from about 10 to 18 carbon atoms, a chlorinated mixture of fatty acids, which mixture of fatty acids, prior to chlorination contains at least 5% of an unsaturated fatty acid having from about 10 to 18 carbon atoms, and which is a mixture of fatty acids corresponding to those occurring in vegetable and animal fats and oils, water-soluble soaps of the said chlorinated unsaturated fatty acids, water-soluble soaps of the said chlorinated mixture of fatty acids, and mixtures thereof, precipitating the protein from the solution by the addition of sulfuric acid to the isoelectric range of the protein, washing the precipitated protein curd and separating and drying the protein.

7. The process of claim 6 wherein the insolubles inhibiting agent added is chlorinated oleic acid.

8. The process of claim 6 wherein the insolubles inhibiting agent added is the chlorinated mixture of fatty acids derived from coconut oil.

9. The process of claim 6 wherein the insolubles inhibiting agent added is the chlorinated mixture of fatty acids derived from cottonseed oil.

10. The process of claim 6 wherein the insolubles inhibiting agent added is the chlorinated mixture of fatty acids derived from soybean oil.

11. The process of claim 6 wherein the insolubles inhibiting agent added is a water-soluble soap of a chlorinated unsaturated fatty acid having from about 10 to 18 carbon atoms.

12. The process of claim 6 wherein the insolubles inhibiting agent added is a water-soluble soap of a chlorinated mixture of fatty acids, which mixture of fatty acids, prior to chlorination, contains at least 5% of an unsaturated fatty acid having from about 10 to 18 carbon atoms, and which is a mixture of fatty acids corresponding to those occurring in vegetable and animal fats and oils.

References Cited in the file of this patent

UNITED STATES PATENTS

| | | |
|---|---|---|
| 2,451,659 | Calvert | Oct. 19, 1948 |
| 2,534,227 | Calvert | Dec. 19, 1950 |
| 2,534,228 | Calvert | Dec. 19, 1950 |